United States Patent [19]

Zupancic

[11] 4,421,834
[45] Dec. 20, 1983

[54] LIQUID CATHODE CELLS WITH A GLASS FIBER SEPARATOR

[75] Inventor: Ronald L. Zupancic, Parma Heights, Ohio

[73] Assignee: Union Carbide Corporation, Danbury, Conn.

[21] Appl. No.: 394,298

[22] Filed: Jul. 1, 1982

[51] Int. Cl.$^3$ ............................................. H01M 4/36
[52] U.S. Cl. .................................... 429/105; 429/196; 429/252
[58] Field of Search ............... 429/101, 105, 196, 247, 429/248, 252

[56] References Cited

U.S. PATENT DOCUMENTS

| | | | |
|---|---|---|---|
| 3,993,501 | 11/1976 | Kalnoki-Kis | 429/101 X |
| 4,216,280 | 8/1980 | Kono | 429/247 |
| 4,221,846 | 9/1980 | Armstrong et al. | 429/29 |
| 4,233,379 | 11/1980 | Gross et al. | 429/247 |
| 4,284,691 | 8/1981 | Goebel et al. | 429/105 |

FOREIGN PATENT DOCUMENTS

| | | |
|---|---|---|
| 55-146871 | of 1955 | Japan . |
| 55-146873 | of 1955 | Japan . |
| 1542690 | 3/1979 | United Kingdom . |
| 2069021 | 1/1980 | United Kingdom . |

OTHER PUBLICATIONS

Advertising Literature Distributed by Crane & Co., Inc., Mar. 1973.

*Primary Examiner*—Charles F. Lefevour
*Attorney, Agent, or Firm*—Cornelius F. O'Brien

[57] ABSTRACT

A nonaqueous cell employing a liquid cathode, such as an oxyhalide, an active anode, such as lithium, a cathode collector, such as carbon and/or graphite, and a separator between said anode and said collector and wherein said separator comprises a uniform mixture of 85 to 95 weight percent glass fibers having a substantially uniform size and 15 to 5 weight percent binder, such as polyvinyl alcohol.

11 Claims, No Drawings

LIQUID CATHODE CELLS WITH A GLASS FIBER SEPARATOR

FIELD OF THE INVENTION

The invention relates to a nonaqueous cell employing a liquid cathode, such as an oxyhalide, halide and/or liquid sulfur dioxide, an active anode such as lithium, a cathode collector, such as a carbonaceous collector, and a separator disposed between said anode and said collector and wherein said separator comprises a uniform mixture of 85 to 95 weight percent glass fibers having a substantially uniform length and 15 to 5 weight percent binder.

BACKGROUND OF THE INVENTION

The continuing development of portable electrically powered devices such as tape recorders and playback machines, radio transmitters and receivers, and the like, create a continuing demand for the development of reliable, long service life cells or batteries for their operations. Recently developed electrochemical cell systems that will provide a long service life utilize highly reactive anode materials such as lithium, sodium and the like, in conjunction with high energy density non-aqueous liquid cathode materials and a suitable salt.

It has recently been disclosed in the literature that certain materials are capable of acting both as an electrolyte carrier, i.e., as solvent for the electrolyte salt, and as the active cathode for a nonaqueous electrochemical cell. British Pat. No. 1,409,307 discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 48th Edition, The Chemical Rubber Co., Cleveland Ohio, 1967–1968. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example such nonaqueous cathode material would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride.

However, one possible disadvantage to the use of a liquid cathode such as thionyl chloride is that if it is not uniformly distributed along the surface of an anode, such as lithium, via a separator, then non-uniform anode consumption could occur and may result in low voltage output, particularly at high discharge rates, and longer voltage delays after storage. In addition, non-uniform distribution of the liquid cathode which could occur from non-uniform liquid cathode wetting of the separator, could cause non-uniform anode dissolution. This non-uniform anode dissolution causes high points and plateaus to form on the anode which may possibly result in localized heating during charging (abuse condition) and might lead to the possibility of anode melting at these discrete points. This could lead to a violent venting of the cell or even to cell disassembly. It is believed that the non-uniform wetting of the separator by the liquid cathode is responsible for decreasing the capacity output of the cell.

It is therefore an object of this invention to provide a cell employing a liquid cathode with a separator that can be uniformly wetted by the liquid cathode and thereby result in an improved discharge performance of the cell, particularly on high rate discharge, and improved safety characteristics of the cell.

Another object of the present invention is to provide a separator for liquid cathode cells that can uniformly absorb large amounts of the liquid cathode and at a fast rate.

Another object of the present invention is to provide a separator for a lithium/oxyhalide cell that can uniformly absorb large amounts of the oxyhalide which will result in improvement in the discharge performance of the cell on high rate discharge and improve the safety characteristics of the cell when exposed to abusive conditions such as charging.

The foregoing additional objects will become more fully apparent from the description hereinafter provided.

SUMMARY OF THE INVENTION

The invention relates to a nonaqueous cell employing a liquid cathode, an active anode, a cathode collector, and a separator disposed between said anode and said collector; the improvement wherein the separator comprises a uniform mixture of 85 to 95 weight percent glass fibers and 15 to 5 weight percent binder, said glass fibers being $\frac{1}{8}$ to $\frac{1}{2}$ inch in length and 2 to 8 microns in diameter, and wherein 90 percent of the fibers are within 20 percent of the average length of the fibers and within 20 percent of the average diameter of the fibers.

The separator for use in this invention has to be sufficiently porous so that it can effectively absorb the liquid cathode. Generally a porosity of 25 percent or more, preferably about 50 percent to 75 percent would be suitable for most cell applications. The separator should have about 85 to 95 weight percent glass fibers and about 5 to 15 weight percent binder and preferably about 91 to 94 weight percent glass fibers and about 9 to 6 weight percent binder. An amount of glass fibers above 95 weight percent would not provide a material suitable for handling when using a conventional binder while an amount of glass fibers below 85 weight percent would not provide sufficient material to effectively absorb the liquid cathode for uniform distribution of the liquid cathode between the anode and the cathode collector. The size (length and diameter) of the glass fibers should be substantially uniform such that at least 90% of the glass fibers should have a length and diameter within 20% of the average length and diameter of the glass fibers and preferably 95% or more of the glass fibers should have a length and diameter within the 20% range. Preferably the length and diameter of at least 90% of the glass fibers should be within about 10% of the average length and average diameter of the glass fibers and more preferably 95% or more of the glass fibers shall fall within this range. The glass fibers should have a length of between about $\frac{1}{8}$ and $\frac{1}{2}$ inch and preferably about $\frac{1}{4}$ inch. The diameter of the glass fibers should be between about 2 and about 8 microns and preferably between about 3 and about 5 microns. It is believed that the smaller diameter fibers provide better (i.e., more rapid) wettability. It is also believed that in separators using large diameter fibers, the ratio of the binder to the surface area of the fibers, for a fixed amount of binder, becomes larger and thus reduces somewhat the ability of the separator to absorb liquid very rapidly. Glass fibers having a diameter below 2 microns would generally be too small for providing desired mechanical strength and handling characteristics for low levels of binder, i.e., 15 weight percent or less binder. Fiber length is believed to be important for good wettability characteristics for the separator. Particularly, the uniformity in length of the glass fibers is of primary importance since it is believed that a wide variation in glass fiber length can result in a "pebbled" or bumpy structure which could result in non-uniform absorption of the liquid cathode leading to the disadvantages recited above.

The preferable binder to be used in fabricating the separator should be a polyvinyl alcohol binder since it is believed that it will promote a faster wetting rate of the separator. Other suitable binders would be polyvinyl acetate, polyvinyl chloride and polymers of polyvinyl acetate and polyvinyl chloride.

The separators of this invention could be made by standard paper-making techniques, i.e., by preparing a slurry of the fibers; casting a sheet of the slurry; and then rolling and drying the cast sheet. Short glass fibers, below ¼ inch, may tend to clump together causing a pebbled appearance on the top surface of the sheet. Thus when the sheet is subsequently rolled, these clumps become more compressed than the surrounding areas, and it is believed that these compacted denser areas tend to wet up at a slower rate or not at all. The more uniform length of the glass fibers contributes to a more uniform distribution of the glass fibers in the sheet and hence to more uniform and more rapid wetting characteristics of the resulting separator.

The thickness of the separator should be between about 0.002 inch and about 0.010 inch, preferably between about 0.005 and 0.007 inch. A separator thickness below 0.002 inch would be ineffective because of short circuiting the anode to the collector while a thickness above 0.010 inch would unduly increase the internal resistance of the cell. Suitable separators for this invention can be obtained from Crane & Company, Inc. of Dalton Mass. under the trademark Craneglas 200, Craneglas 210, and Craneglas 230.

The preferred separator for this invention would have the following characteristics:
  separator thickness: 0.005 to 0.007 inch (preferably 0.005 inch)
  fiber diameter: about 3 to 4 microns
  fiber length: about ¼ inch (uniform)
  binder type: polyvinyl alcohol
  binder level: 7–8 wt.% (uniformly distributed at fiber junctions)
  uniformity of absorption: highly uniform
  preferred rate of absorption at 20° C.: less than about 10 seconds for a 0.20 ml drop of water to be absorbed on the surface of the separator
  preferred wicking rate at 20° C.: consistently less than about 45 seconds, preferably about 25 seconds or less for water to rise up 1 inch on a separator sheet in which its lower section is submerged in the water 1 inch.

Suitable nonaqueous liquid cathode materials for use in cells employing this invention would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride and mixtures thereof. Another suitable cathode material would be liquid sulfur dioxide.

The anode for use in the cells of in this invention can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using lithium anodes, the anode may be coated with a vinyl resin as disclosed in U.S. Pat. No. 3,993,501, said patent incorporated herein by reference.

The cathode collector for use in cells suitable for this invention has to be electronically conductive so as to permit external electrical contact to be made with the active cathode material and also provide extended area reaction sites for the cathode electrochemical process of the cell. Materials suitable for use as a cathode collector are carbon materials and metals, such as nickel, with acetylene black being preferable. In addition, the cathode collector when made of particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include polyvinyl, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wet-proof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

The solute for use in the cells suitable for this invention may be simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July-/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminium chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

The container of the battery could be made of stainless steel, iron, nickel, plastic, coated metals or some other suitable material.

Some preferred combinations of nonaqueous cathode materials and anodes would be as follows:
(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Preferably, the cells for use in this invention would be liquid oxyhalide cells using sulfuryl chloride, thionyl chloride or mixtures thereof with a lithium anode.

EXAMPLE I

Several 0.475 inch diameter cells (Lot A) were constructed each using a lithium anode, a cathode collector of teflon-bonded acetylene black, and an electrolyte solution comprising a liquid cathode of thionyl chloride containing 1.5 M $LiAlCl_4$. A five mil thick non-woven glass fiber separator, obtained from Crane & Company, Inc. of Dalton, Mass. under the tradename Craneglas 200, was placed between the anode and the cathode collector of each cell. The separator comprised a uniform distribution of about 93 weight percent glass fibers, each being about ¼ inch long and having a diameter about 3.5 microns, and about 7 weight percent polyvinyl alcohol binder. Several similar cells (Lot B) were constructed each using the same components as above except that the separator in each cell comprised a uniform distribution of about 96 weight percent glass fibers, each being about ¼ inch long and having a diameter about 0.5 to 0.7 microns, and about 4 weight percent acrylic (poly) binder. The cells in each Lot were charged (abusive charge test) at different currents, as shown in Table 1, until they vented. The venting of each cell was observed and categorized as shown in Table I.

TABLE I

| | Lot A | | | Lot B | |
|---|---|---|---|---|---|
| Cell | Charge (Ampere) | Observation (Vent) | Cell | Charge (Ampere) | Observation (Vent) |
| 1 | 1.0 | *Didn't vent | 1 | 1.0 | hissing noise |
| 2 | 1.0 | *Didn't vent | 2 | 1.0 | **moderate noise |
| 3 | 1.8 | smell only no noise | 3 | 1.0 | **moderate noise |
| 4 | 1.5 | smell only no noise | 4 | 1.0 | **moderate noise |

*cell was recharged at 1.5 amperes and vented by observing smell only without any noise
**moderate noise was louder than the hissing noise As evident from the data shown in Table I, the separator of this invention will provide a safety feature when used in lithium/oxyhalide cell systems that are subjected to abusive conditions.

EXAMPLE II

Several Lot A and Lot B cells were constructed as in Example I. Each cell was discharged across a specific load to a 2.7 volt cutoff whereupon the amount of lithium remaining in the cell along with the delivered output power of each cell were recorded and are shown in Table 2. A transducer was placed under each cell and then the flame of a laboratory gas burner was directed against the cell. The peak force recorded during the venting of each cell was observed and is shown in Table 2. The data shown in Table 2 clearly illustrates the superior results obtainable in a liquid cathode cell using the separator of this invention.

TABLE 2

| Load (ohms) | 15 | 25 | 35 | 50 | 75 | 250 |
|---|---|---|---|---|---|---|
| Approx. Cell Output (ampere-hours) | 0.22 | 0.32 | 0.50 | 0.60 | 0.78 | 1.18 |
| Approx. Grams of Li Remaining | 0.27 | 0.25 | 0.20 | 0.17 | 0.13 | 0.02 |
| Vent Force (lbs) | Number of Cells Lot A | | | | | |
| About 35 | 0 | 0 | 0 | 0 | 0 | 0 |
| About 12 | 2 | 2 | 1 | 2 | 1 | 0 |
| About 5 | 3 | 3 | 3 | 1 | 1 | 1 |
| Vent Force (lbs) | Number of Cells Lot B | | | | | |
| About 35 | 4 | 3 | 2 | 2 | 1 | 0 |
| About 12 | 0 | 1 | 1 | 2 | 2 | 1 |
| About 5 | 0 | 1 | 2 | 1 | 2 | 1 |

EXAMPLE III

Three Lot A cells and three Lot B cells were constructed as in Example I. The cells in each Lot were stored at 71° C. for one month and then were discharged across a 75-ohm load and the voltage observed for each cell was recorded. The average voltage observed for three cells in each cell Lot as a function of time is shown in Table 3.

TABLE 3

| Time (seconds) | Lot A Voltage-(volts) | Lot B Voltage-(volts) |
|---|---|---|
| 0.8 | 2.38 | 2.00 |
| 1.0 | 2.40 | 2.20 |
| 3.0 | 2.80 | 2.44 |
| 5.0 | 2.85 | 2.62 |
| 7.0 | 2.88 | 2.73 |
| 9.0 | 2.90 | 2.81 |

As evident from the data shown in Table 3, the performance of cells using the separator of this invention was far superior to the performance of the cells using separators of the prior art.

I claim:

1. A nonaqueous cell employing a liquid cathode containing a solute, an active anode, a cathode collector, and a separator disposed between said anode and said cathode collector; the improvement wherein the separator comprises a uniform mixture of 85 to 95 weight percent glass fibers and 15 to 5 weight percent binder, said glass fibers being ⅛ to ½ inch in length and 2 to 8 microns in diameter, and wherein at least 90 percent of the glass fibers are within 20 percent of the average length of the glass fibers and within 20 percent of the average diameter of the glass fibers.

2. The nonaqueous cell of claim 1 wherein at least 95 percent of the glass fibers are within 20 percent of the average length of the glass fibers and within 20 percent of the average diameter of the glass fibers.

3. The nonaqueous cell of claim 1 wherein at least 95 percent of the glass fibers are within 10 percent of the average length of the glass fibers and within 10 percent of the average diameter of the glass fibers.

4. The nonaqueous cell of claim 1 wherein the glass fibers are about ¼ inch in length and between about 3 and 4 microns in diameter.

5. The nonaqueous cell of claim 1 wherein the binder is selected from the group consisting of polyvinyl alcohol, polyvinyl acetate, polyvinyl chloride and polymbers of polyvinyl acetate and polyvinyl chloride.

6. The nonaqueous cell of claim 1 wherein the glass fibers in the separator are 91 to 94 weight percent and the binder is 6 to 9 weight percent.

7. The nonaqueous cell of claim 1, 4, 5 or 6 wherein the separator is between about 0.002 inch and about 0.01 inch thick.

8. The nonaqueous cell of claim 7 wherein the separator is between about 0.005 inch and about 0.007 inch thick.

9. The nonaqueous cell of claim 7 wherein the liquid cathode comprises at least one liquid oxyhalide selected from the group consisting of thionyl chloride, sulfuryl chloride, phosphorous oxychloride, thionyl bromide, chromyl chloride, vanadyl tribromide and selenium oxychloride.

10. The nonaqueous cell of claim 7 wherein the at least one liquid oxyhalide is thionyl chloride.

11. The nonaqueous cell of claim 7 wherein the anode is selected from the group consisting of lithium, sodium, calcium, potassium and aluminum.

* * * * *